No. 829,820. PATENTED AUG. 28, 1906.
T. R. WILEY.
AGRICULTURAL GATE.
APPLICATION FILED MAR. 19, 1906.

Witnesses
W. Rees Edelen.
B. S. Gardner.

Inventor
Thomas R. Wiley
By Shepherd & Parker
Attorneys.

UNITED STATES PATENT OFFICE.

THOMAS R. WILEY, OF BREWSTER, MINNESOTA.

AGRICULTURAL GATE.

No. 829,820.  Specification of Letters Patent.  Patented Aug. 28, 1906.

Application filed March 19, 1906. Serial No. 306,832.

*To all whom it may concern:*

Be it known that I, THOMAS R. WILEY, a citizen of the United States, residing at Brewster, in the county of Nobles and State of Minnesota, have invented certain new and useful Improvements in Agricultural Gates, of which the following is a specification.

This invention relates to new and useful improvements in agricultural gates; and it pertains to that particular type in which means are provided for elevating the gate independent of its swinging movement in either direction to permit the passage of small live stock thereunder.

In connection with a construction of the above general type I have provided novel means for maintaining the gate at any desired elevation and means for counterbalancing the weight of the gate in an elevated position.

The detailed construction will appear in the course of the following description, in which reference is had to the accompanying drawings, forming a part of this specification, wherein like numerals of reference designate corresponding parts in all of the figures of the drawings.

Figure 1:
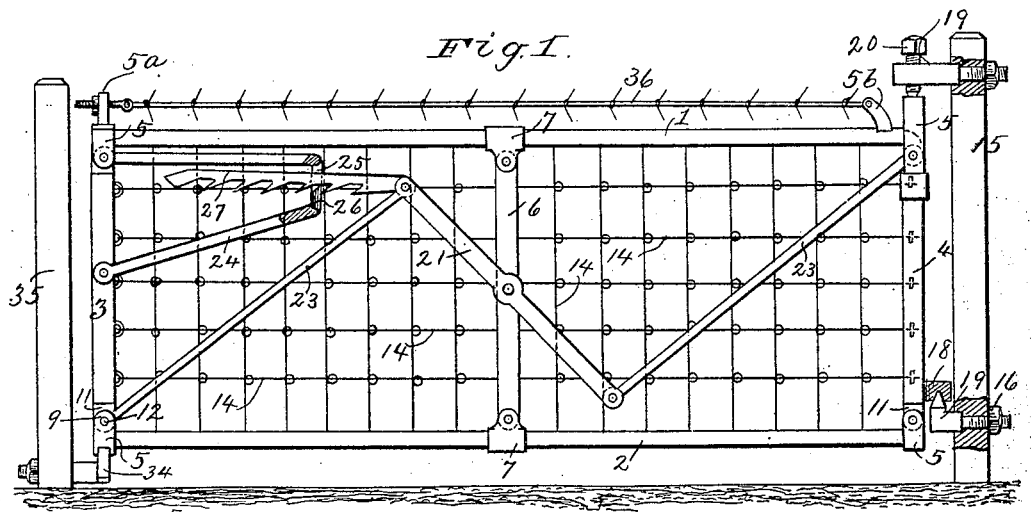
Figure 2:
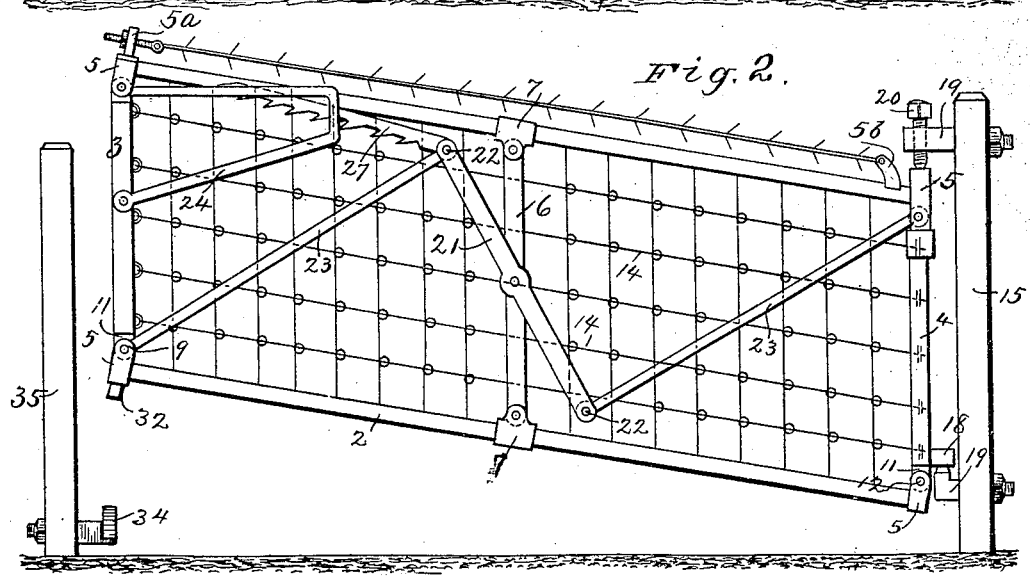
Figure 3:
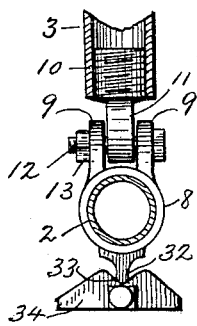

Figure 1 is a side elevation illustrating the gate in the closed position. Fig. 2 is similar view showing the same slightly raised. Fig. 3 is a detail transverse section of a locking-catch which I employ; and Fig. 4 is a detail side elevation of the counterbalancing device.

To put my invention into practice, I employ a gate embodying a rectangular frame and a wire mesh held thereby. The frame comprises horizontal top and bottom bars 1 and 2 and vertical side bars 3 and 4. These bars are preferably tubular in cross-section, so as to add strength to the structure. Bar 1 carries at its upper end a depending bracket 5, by which it has pivotal connection with the bar 3. Similar brackets 5 are carried at each end of the bar 2 and serve as one member of the pivotal connection thereof with the bars 3 and 4. The bars 1 and 2 are braced by a vertical member 6, which is fulcrumed at its end to brackets 7, carried by the bars 1 and 2 of similar construction to the brackets 5. The pivotal connection between the bars is shown in detail in Fig. 3. The brackets 5 are formed with a sleeve 8, surrounding the bar 2 and extending vertically from said sleeve, with parallel apertured ears 9, having their openings in axial alinement. A block 10 is threaded into the end of the rod 3 and complements the bracket 5 in its function as a pivotal connection. Said block 10 is formed with a depending perforated extension 11, which extends into the space between the ears 9 and is positively held therein by a bolt 12, extending through said ears into the lug 11 and secured by a nut 13, the bolt 12 serving as a pintle. The brackets 7 above mentioned are of substantially the same construction and possess the same form of connection as brackets 5. The body of the gate is constituted of wire mesh 14 of common form, which is held in the frame of the gate in the usual manner. The side bar 4 is of greater length than the side bar 3, the upper end of said bar 4 serving as a bearing or hinge connection thereof. Said bar 4 is provided with a slot adjacent to its upper end, and the constricted inner end of the bar 1 extends into said slot and has pivotal connection therein. The frame swings from a post 15 and is supported upon hinges of common form comprising a lower angular bracket 16, secured in said post and terminating in a point 17, engaging with a recessed bracket 18, carried by the side bar 4, and an upper bracket 19, carrying an adjustable point connection 20, which engages the recessed upper end of the side bar 4.

Means for locking the gate in its different vertical positions comprise a lever 21, having pivotal connection with the member 6 at a point central thereof, said lever being fulcrumed at its ends, as at 22, to diagonal and parallel links 23, which have their free ends fulcrumed to the adjacent end of the side bars 3 and 4. The side bar 3 carries from its upper portion a rearwardly-extending yoke 24 of substantially U shape in side elevation. The yoke 24 is formed in its transverse connecting portion with a longitudinal slot 25 and adjacent to said slot with a pointed shoulder or tooth 26. A rack-bar 27 has pivotal connection with the lever 21 at the point 22. In the operation of the gate the rack-bar 27 is designed to have movement in the slot 25, and the toothed shoulder 26 thereof engages the teeth of the bar 27.

Figure 4:
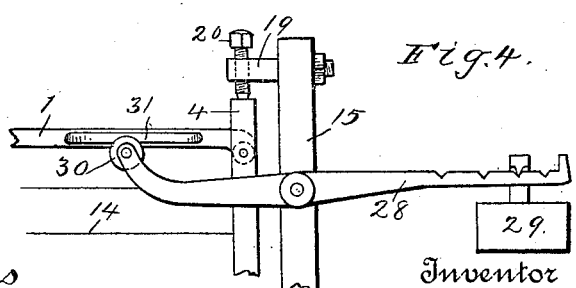

In Fig. 4 I have shown means for counterbalancing the gate, comprising a lever 28, fulcrumed to the post 15 and carrying at its outer end a movable and adjustable counterbalancing-weight 29 and at its inner end a friction-roller 30, which rides upon a track 31, carried upon the top bar 1.

As shown in Fig. 3, the sleeve 8, connected to the outer end of the bar 2, is provided with a depending knob 32, which engages in a recess 33, formed in the latch-plate 34, secured to the adjacent post 35.

The bracket 5 at the outer end of the bar 1 is provided with an apertured upward extension 5$^a$, and at the inner end of the bar 1 an angular projection 5$^b$ is provided. A transverse wire or rod 36 is held between the extensions 5$^a$ and 5$^b$, the rod 36 being formed with a plurality of barbs closely associated and disposed at intervals thereupon. The provision of the barb-wire 36 constitutes a means for preventing intruders from climbing over the gate when the same is locked.

In operation it is assumed that the gate is in the closed position shown in Fig. 1. When it is desired to raise the same for the passage of small live stock, such as hogs and fowls thereunder, the gate is manually lifted into the position shown in Fig. 2, but without necessarily being swung upon its hinges to either side. As the gate is lifted the side bars 3 and 4 will constantly remain parallel and in a vertical position owing to their fulcrumed connection with the bars 1 and 2. Said bars 3 and 4 will approach each other, however, as the gate is moved, and in this movement the links 23 are moved upon their pivots, so as to swing the lever 21 to a more nearly vertical position and move the bar 27 outwardly with relation to the yoke 24. The gate is supported in any position in which it is left after the vertical movement thereof by the engagement of the toothed shoulder 26, carried by the yoke 24, with the rack-bar 27, which by its connection with the lever 21 and links 23 will maintain the former in a slightly raised and suspended position. The weight 29 reduces the labor of lifting the gate and prevents any sudden reactionary movement thereof on its return to initial or closed position.

Having fully described my invention, I claim—

1. An agricultural gate, comprising a frame formed of top, bottom and side bars having an interconnected pivotal relation with one another, a vertical brace-bar having its ends pivoted to said top and bottom bars, at points approximately central thereof, a stationary catch supported upon the front portion of said frame, a lever centrally pivoted upon said brace-bar, compensating connections between said lever and said side bars and a pivoted latching element carried by said lever for engagement with said catch.

2. An agricultural gate, comprising a frame formed of top, bottom and side bars, having an interconnected pivotal relation with one another, a vertical brace-bar having its ends pivoted to said top and bottom bars at points approximately central thereof, a stationary horizontal catch supported upon the front portion of said frame, a lever centrally pivoted upon said brace-bar, compensating connections between said lever and the side bars and a toothed latching element pivoted to the upper end of said lever and supported upon said catch, said element being designed to engage said catch and maintain said gate in a selected position.

In testimony whereof I affix my signature in presence of two witnesses.

THOMAS R. WILEY.

Witnesses:
 THOS. T. STRAND,
 C. R. WEST.